United States Patent [19]
Orii et al.

[11] 3,860,747
[45] Jan. 14, 1975

[54] FACSIMILE TRANSMITTER-RECEIVER COMPRISING LIGHT SOURCE AND PHOTOELECTRIC DEVICE ALIGNED WITH AXIS OF ROTATION OF PHOTO-SENSING AND RECORDING DISK

[75] Inventors: Masayoshi Orii; Takayuki Saito; Ryuji Saito; Susumu Kawase; Tsutomu Mashizu; Masayoshi Watanabe, all of Tokyo, Japan

[73] Assignees: Nippon Telegraph Telephone Public Corporation; Nippon Electric Company Limited, Tokyo, Japan

[22] Filed: Dec. 26, 1972

[21] Appl. No.: 318,242

[30] Foreign Application Priority Data

Dec. 24, 1971 Japan .................................. 46-2283
Dec. 24, 1971 Japan .................................. 46-2284

[52] U.S. Cl. ................................ 178/6, 178/DIG. 2
[51] Int. Cl. ............................................. H04n 1/24
[58] Field of Search ............... 178/7.6, 6.6 R, 6.6 A, 178/DIG. 2, 6

[56] References Cited

UNITED STATES PATENTS

| | | | |
|---|---|---|---|
| 2,776,336 | 1/1957 | Claver | 178/6.6 |
| 2,864,886 | 12/1958 | Lemmon | 178/7.1 |
| 3,064,077 | 11/1962 | Cary | 178/6.6 |
| 3,249,692 | 5/1966 | Clay | 178/7.1 |
| 3,469,027 | 9/1969 | Reese et al. | 178/6 |
| 3,670,099 | 6/1972 | Oliver | 178/6 |
| 3,699,249 | 10/1972 | Crane et al. | 178/6.6 R |

*Primary Examiner*—Howard W. Britton
*Assistant Examiner*—Michael A. Masinick
*Attorney, Agent, or Firm*—Ostrolenk, Faber, Gerb & Soffen

[57] ABSTRACT

An original picture and a recording paper are fed in side by side relation along the axis of a photo-sensing and recording rotatable disk with a predetermined gap left between the sheet-like members and the periphery of the disk. A light source and a photoelectric device are aligned with the axis. A light conductive device directs the light to one or more points predetermined relative to the periphery and from the points to the photoelectric device to provide the photo-sensing device.

10 Claims, 6 Drawing Figures

FACSIMILE TRANSMITTER-RECEIVER COMPRISING LIGHT SOURCE AND PHOTOELECTRIC DEVICE ALIGNED WITH AXIS OF ROTATION OF PHOTO-SENSING AND RECORDING DISK

BACKGROUND OF THE INVENTION:

This invention relates to a combination of facsimile transmitter and receiver. In particular, this invention relates to a device for deriving from an original picture a photoelectric signal for transmission as a facsimile transmission signal and for reproducing a picture on a recording medium from a reproduction signal reproduced from a similar facsimile transmission signal.

Conventional fascimile transmitter-receivers may broadly be classified into two classes. A transmitter-receiver of one of the classes is provided with a drum rotatable about a predetermined axis and adapted to mount a sheet-like member, and an optical sensing and a recording device slidable along the rotary axis of the drum to repeatedly scan the sheet-like member. On carrying out transmission, an original picture is placed around the drum. During reception, a recording medium is used as the sheet-like member. The area scanning is carried out by synchronizing the sliding movement with the rotation of the drum. With this apparatus, either an original picture or a receiving medium must be inserted sheet by sheet. An apparatus of the other class comprises a disk rotatable about a predetermined axis and provided with an optical sensing and a recording device, and a feeder for feeding a sheet-like member along the rotary axis of the disk with the sheet-like member put into tangential contact with the disk. This apparatus is capable of either dealing with a long original picture or receiving a plurality of pictures in succession on a long recording medium but is incapable of operating simultaneously as a transmitter and a receiver.

SUMMARY OF THE INVENTION

It is therefore an object of the present invention to provide a combination of facsimile transmitter and receiver capable of carrying out simultaneous transmission and reception.

It is another object of this invention to provide a combination of facsimile transmitter and receiver capable of carrying out continued transmission and reception According to this invention there is provided a combination of facsimile transmitter and receiver including a transmitter responsive to a photoelectric signal derived from an original picture for producing a facsimile transmission signal representative of said original picture, and a receiver responsive to a facsimile transmission signal representative of an original picture for simultaneously producing a reproduction signal for reproducing the last-mentioned original picture on a recording medium, wherein the improvement comprises a rotor having a substantially circular cylindrical peripheral surface and rotatable about a predetermined axis, a sheet-like member feeder for feeding a pair of sheet-like members along said axis with one surface of each of said members being held facing said peripheral surface and with a predetermined gap left between said one surface and said peripheral surface and a space left between a pair of adjacent side edges of said member, one of said members having an original picture on said one surface, said one surface of the other member serving as said recording medium, a light source and a photoelectric device substantially aligned with said axis, a light conductive device for guiding the light emitted by said light source to at least one first point predetermined with respect to said peripheral surface and from said point to said photoelectric device, said photoelectric device being capable of producing said photoelectric signal, and a recording device fixed to at least one second point predetermined in relation to said peripheral surface and responsive to said reproduction signal for reproducing said last-mentioned picture on said recording medium.

Figure 1:
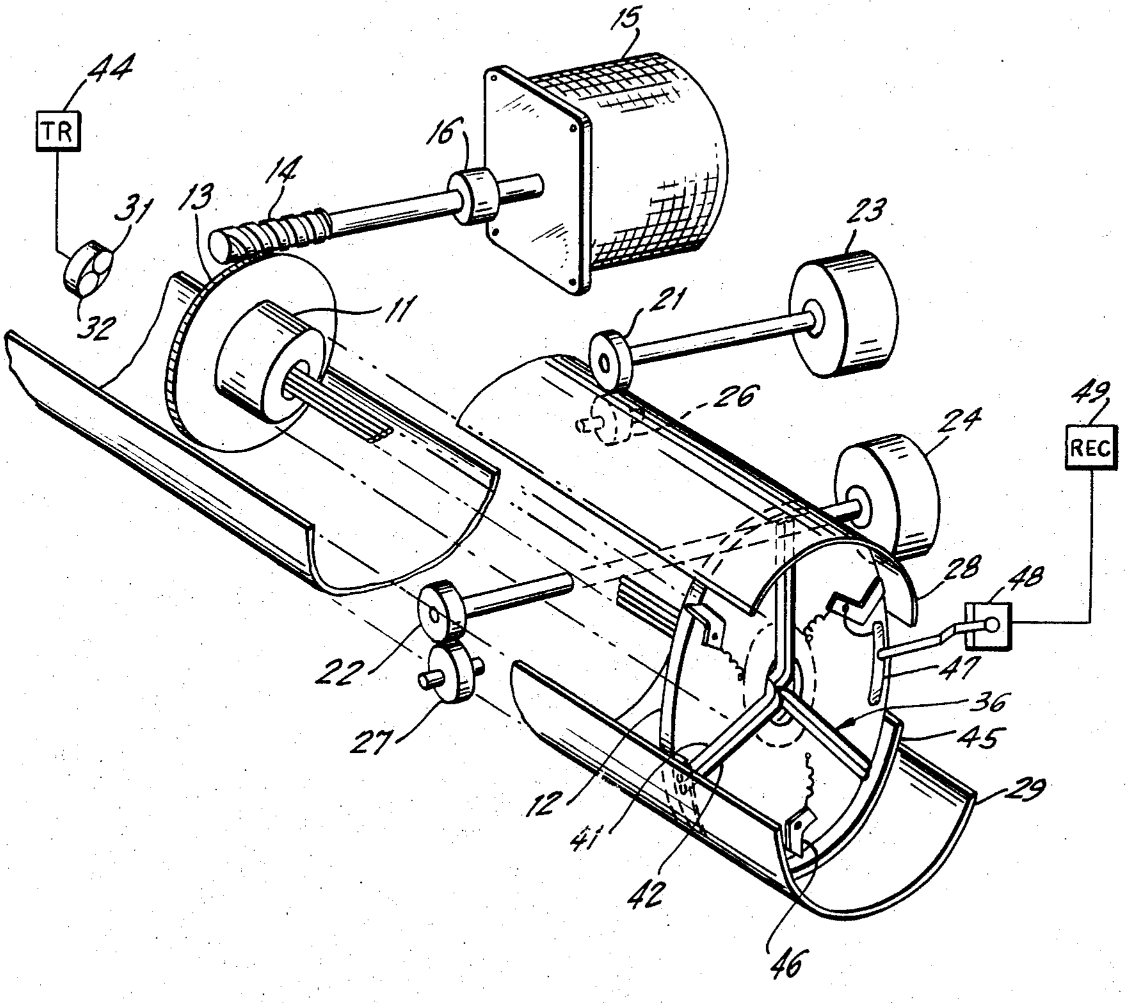
FIG. 1 is a perspective view of a first embodiment of the instant invention.
Figure 1A:
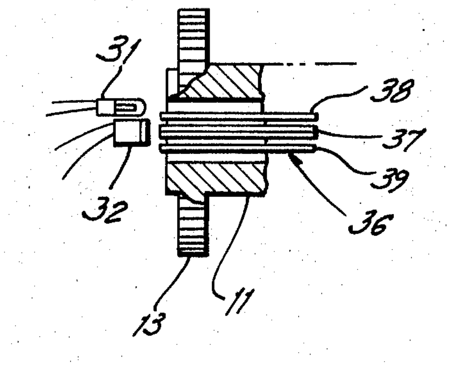
FIG. 1*a* shows a fragmentary side view of the first embodiment, partly in axial section, for explaining the arrangement of a light source and a photoelectric device depicted in FIG. 1.

DESCRIPTION OF THE PREFERRED EMBODIMENTS:

Referring to FIG. 1, a first embodiment of the present invention comprises a hollow cylindrical shaft 11 rotatably mounted on a frame (not shown), a disk or rotor 12 fixed to one end of the shaft 11 and having a substantially circular cylindrical rigid peripheral surface, a worm wheel 13 fixed to the other end of the shaft 11, a worm 14 engaging with the worm wheel 13, a driving motor 15 for rotating the worm 14 via a coupling device 16, a first and a second driving roller 21 and 22, two roller driving motors 23 and 24 for the driving rollers 21 and 22, respectively, and two idler rollers 26 and 27 cooperating, respectively, with the driving rollers 21 and 22. Driven by the roller driving motors 23 and 24, the driving rollers 21 and 22 feed in cooperation with the idler rollers 26 and 27 a pair of sheet-like members, namely, an original picture medium 28 and a recording medium 29, along the axis of the shaft 11 at a predetermined relatively low speed with the picture bearing and the sensitive recording surfaces held facing the peripheral surface of the disk 12 and with a predetermined gap left between the inwardly directed surface of each of the sheet-like members 28 and 29 and the rotor peripheral surface by means not shown in FIG. 1. It is to be noted that the width of each of the sheet-like members 28 and 29 is preferably less than about one-third of the periphery of the disk 12 to leave a space between a pair of adjacent side edges of the sheet-like members 28 and 29. Each of the sheet-like members 28 and 29 may be fed from a supply reel along a guiding member for adjusting the sheet to the peripheral surface of the disk in the manner later illustrated with reference to FIG. 3. In the manner known in the art, the original picture as called herein may be a manuscript on which only letters and punctuation marks are written. The embodiment further comprises a light source 31 and a photoelectric device 32 disposed in substantial alignment with the axis of the shaft 11 adjacent the worm wheel 13 axially outwardly thereof, and a light conductive device 36 comprising three pairs of light conductors 37, 38, and 39 arranged in the manner best shown in FIG. 1*a*. Each of the light conductors is made of a bundle of optical fibers, caused to pass through the worm wheel 13 and the shaft 11 held by the latter, and then bent radially outwardly to extend either through the body of the disk 12 or along the surface thereof beyond the peripheral surface, reaching one of three points predetermined in relation to the peripheral surface. The light emitted by the light source 31 is guided by the first light conductors 41 to reach the first predetermined points, reflected by the sheet-like members 28 and 29 as the disk 12 rotates, guided through the second light conductors 42, and then received by the photoelectric device 32 to become a photoelectric signal, from which a transmitter 44 derives a facsimile transmission signal representative of the original picture. If the recording surface of the recording medium 29 is appreciably reflective, a blackout member 45 may be interposed between the recording medium 29 and the peripheral surface of the disk 12 with the non-relfective face directed inwardly. The embodiment still further comprises three recording styli 46 pivotally attached to the surface of the disk 12 so that the points thereof are placed at a second set of three points predetermined with respect to the peripheral surface of the disk 12 which points preferably substantially arcuately bisect the spans between the first predetermined points, three slip ring members 47 fixed either to the one side surface or the cylindrical peripheral surface of the disk 12 substantially flush therewith between the styli 46 and electrically connected to the respective styli 46, and a flexible electric contact member 48 attached to the frame so as to be successively brought into contact with the slip ring members 47 as the disk 12 rotates. The recording styli 46 are spring urged to slidably engage the sheet-like members 28 and 29, receive a reproduction signal through the contact member 48 from a receiver 49 for producing the reproduction signal from a facsimile transmission signal representative of an original picture, and reproduce the picture on the recording medium 29 which is sensitive to the reproduction signal. The facsimile transmission signal produced by the transmitter 44 may be fed to the associated receiver 49 to reproduce the picture while being transmitted. Incidentally, the original picture 28 may be held slightly radially outwardly of the recording medium 29 so that the recording styli 46 may not be brought into contact with the surface of the original picture 28.

Figure 2:
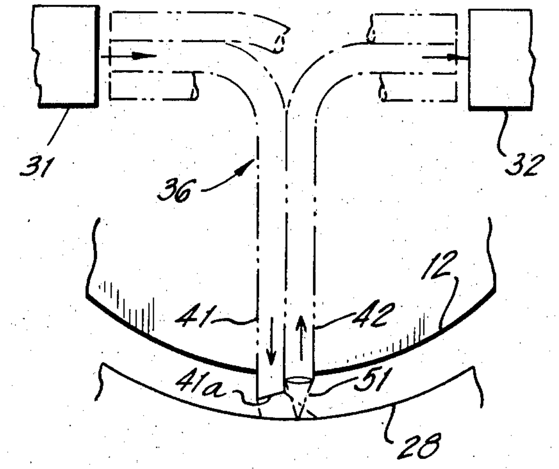
FIG. 2 is a partial schematic diagram showing the details of a light conductive device used in the first embodiment illustrated in FIG. 1 and in a modification of the first embodiment.

Referring to FIG. 2, the radially aligned outward end of each first light conductor 41 extends slightly beyond the associated end of each second light conductor 42 and is bevelled at 41*a* to direct the light guided therethrough slightly towards the associated second conductor 42. Each second conductor 42 may be provided with a lens 51 for collecting the light reflected by the sheet-like members 28 and 29.

Further referring to FIG. 2, the light source 31 and the photoelectric device 32 may be disposed on opposite sides of the disk 12 as schematically depicted therein, one being adjacent the worm wheel 13 and the other being remote therefrom. With this arrangement, it is preferable to attach the disk 12 to the axial middle portion of the shaft 11.

Figure 3:
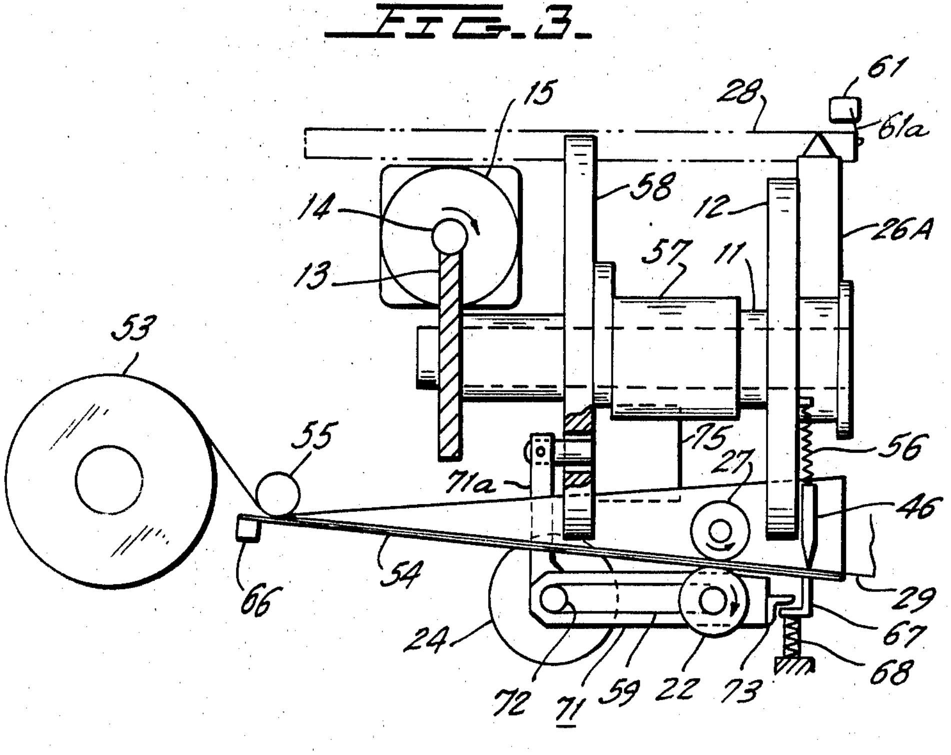
FIG. 3 is a side view of a second embodiment of this invention.
Figure 4:
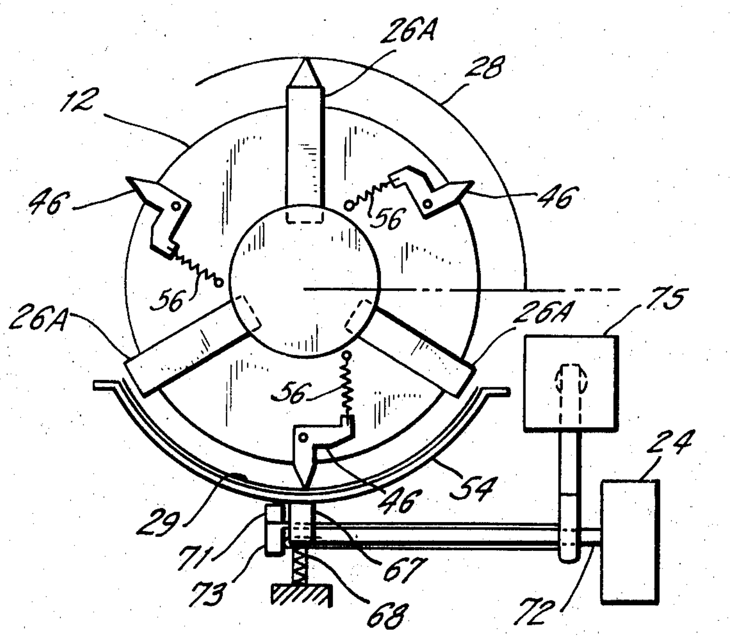
FIG. 4 is a front view of a photo-sensing and recording device for use in the second embodiment illustrated in FIG. 3.

Referring to FIGS. 3 and 4, a second embodiment of the invention comprises a hollow cylindrical shaft 11, a rigid disk or rotor 12, a worm wheel 13, a worm 14, a shaft driving motor 15, a first driving roller (not shown), a second driving roller 22, a driving motor 24 and an idler roller 27 for the second driving roller 22, and three photo-sensitive devices 26A, all similar to the corresponding components illustrated with reference to FIG. 1. An original picture 28 is fed in a manner similar to the original picture feeding illustrated with reference to FIG. 1. In FIG. 3, a recording medium 29 is fed from a supply reel 53 along a guide plate 54 which serves in cooperation with a guide roller 55 to hold the medium 29 with a predetermined gap left between the peripheral surface of the disk 12 and the medium 29 and to adjust the medium 29 to the curvature around the peripheral surface. The second embodiment further comprises three recording styli 46 urged substantially radially otwardly and towards the recording medium 29 by a limited amount by three coil springs 56 mentioned in conjunction with the first embodiment. In FIG. 3, the shaft 11 is depicted as being rotatably supported by a bearing 57 fixed to a portion 58 of the frame. Also, the driving roller 22 is shown as being driven by the motor 24 via an endless belt 59. The second embodiment still further comprises a picture detector 61 disposed along the path of the original picture 28 for discriminating presence and absence of the original picture medium 28. The detector 61 may be a microswitch having a switch arm 61a brought into light contact with the original picture medium 28, if any, to produce a detection electric signal. The second embodiment still further comprises a recording medium retracting device comprising a pivotal axis 66 for pivotally supporting the guide plate 54 at its end adjacent to the supply reel 53, a first latch 67 fixed to the guide plate 54 toward the other end, a coil spring 68 for urging the guide plate 54 towards the recording styli 46 so as to insure slight pressure contact between the styli 46 and the recording medium 29, a bell crank 71 pivotally supported by a shaft 72 of the motor 24 and provided with a first sidewise extending arm carrying the second driving roller 22 and having a second latch 73 for engagement with the first latch 67, and an electromagnet 75 energized by the detection signal during transmission of an original picture on medium 28 to pull a second upwardly extending arm 71*a* of of the bell crank 71, pushing the guide plate 54 down until the latches 67 and 73 are brought into engagement, thereby retracting the recording medium 29 from contact with the recording styli 46 and disengaging the second driving roller 22 from the cooperating idle roller 27 to stop feeding of the medium 29.

Figure 5:
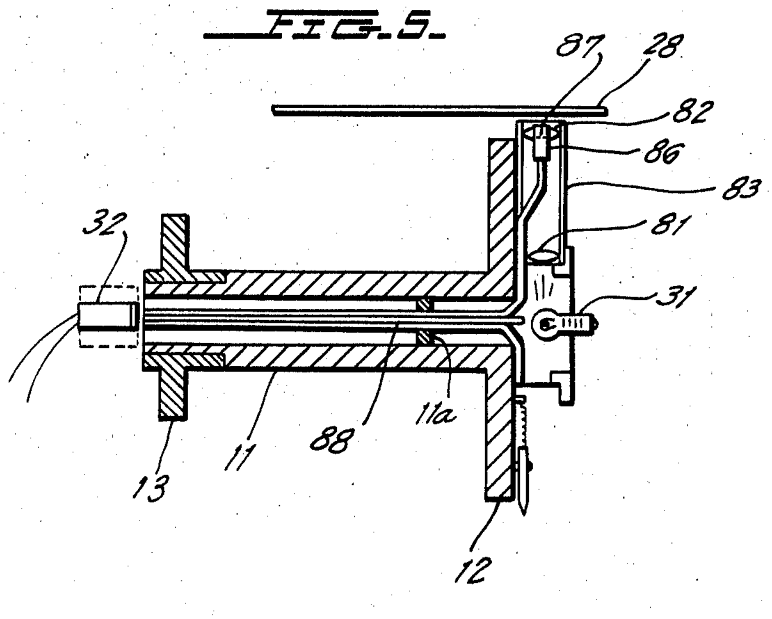
FIG. 5 is an axial sectional view of a modified optical sensing device used in the second embodiment depicted in FIG. 3.

Referring finally to FIG. 5, each of the photo-sensing devices 26A may comprise an optical system serving as the corresponding first light conductor 41 and in turn comprising a first lens 81, a second lens 82 having a bore at its center, and a hollow tube 83 carried by the disk 12 for supporting the lenses 81 and 82, one adjacent the light source 31 situated on the axis of the disk 12 in alignment with the body tubes 83 and the other approximately flush with the peripheral surface of the disk 12. Instead of the actual light source 31 depicted in FIG. 5, a reflector (not shown) may be disposed which reflects the light sent from a remotely situated light source to serve as an apparent light source. The photo-sensing device 26A further comprises three second light conductors 42, each in turn comprising a small hollow cylindrical member 86 received by the central bore of the second lens 82, a condenser lens 87 supported by the cylindrical member 86 substantially flush with the peripheral surface of the disk 12, and a bundle of optical fibers 88 fixed to the other end of the cylindrical member 86 and extending through the hollow cylindrical shaft 11 which secures the fibers at 11a, with the opposite end of the fibers being adjacent photoelectric device 32.

While this invention has thus far been described in conjunction with some embodiments thereof and several modifications, it will be appreciated that two or more streams of the long recording mediums, such as 29, may be fed along the rotary disk 12 to simultaneously provide a plurality of reproduced pictures. As for the second embodiment, the detection signal produced by the picture detector 61 may be switched off to achieve simultaneous transmission of an original picture and reception of the facsimile transmission signal.

What is claimed is:

1. A combination of facsimile transmitter and receiver including a transmitter responsive to a photoelectric signal derived from an original picture for producing a facsimile transmission signal representative of said original picture, and a receiver responsive to said facsimile transmission signal representative of the original picture for generating a reproduction signal representative of the last-mentioned original picture for reproducing the last-mentioned original picture on a recording medium, wherein the improvement comprises:

a rotor having a substantially cylindrical peripheral surface and rotatable about a predetermined axis, a sheet-like member feeder for simultaneously linearly feeding a first and a second sheet-like member along said peripheral surface parallel to said axis with one surface of each of said members being held facing said peripheral surface and with a predetermined gap provided between said one surface of said first member and said peripheral surface and a space left between each pair of adjacent side edges of said members, said first member having an original picture on said one surface, said one surface of said second member serving as said recording medium, a light source and a photoelectric device fixed relative to and substantially aligned with said axis, a light conductive device positioned along said axis and rotor for guiding the light emitted by said light source to at least one first point predetermined with respect to said peripheral surface to project said light onto said surfaces of said members and for directing light reflected from said one surface of said first member towards said photoelectric device, said photoelectric device being capable of producing said photoelectric signal, and a recording device mounted upon said rotor and being located thereon at a second point predetermined in relation to said rotor peripheral surface so as to be engageable only with said second member and responsive to said reproduction signal for reproducing that original picture on said recording medium, which the last-mentioned reproduction signal is representative of, said rotor including means for coupling said reproduction signal to said recording device only when said recording device traverses said second member.

2. A combination of facsimile transmitter and receiver according to claim 1, wherein said sheet-like member feeder comprises a guide plate movable between a first and a second position and having an inner surface facing said axis and an arcuate portion disposed concentrically relative to said rotor peripheral surface when said guide plate is in said first position, roller means for feeding said second sheet-like member along said inner surface, and retracting means for moving said guide plate from said first position to said second position, said inner surface extending substantially parallel to said axis when said guide plate is in said first position, said arcuate portion being disposed radially outwardly and away from said rotor peripheral surface when said guide plate is in said second position.

3. A combination of facsimile transmitter and receiver according to claim 2, wherein said retracting means comprises detector means disposed adjacent said first and second predetermined points for discriminating between presence and absence of said first sheet-like member, a lever operatively coupled to said guide plate and selectively movable between a first and a second position, and means responsive to the result of discrimination for moving said lever between its first and second positions wherein said lever moves said guide plate to its first and second positions, respectively, and said roller means comprises a first roller rotatably fixed relative to said axis and a second roller carried by said lever, said second roller being urged towards said first roller to feed said second sheet-like member along said inner surface when said lever is in its first position, said second roller being displaced from said first roller to terminate feeding of said second sheet-like member when said lever is moved to its second position.

4. A combination of facsimile transmitter and receiver according to claim 1, wherein said light conductive device comprises a first and a second light conductor having substantially radial portions adjacent and parallel to one another and extending radially outward along said rotor and having their outer ends adjacent said first predetermined point, said first light conductor extending between the said first predetermined point and said light source, said second light conductor extending between said first predetermined point and said photoelectric device, a lens positioned adjacent the outer end of said second light conductor, said lens having an optical axis aligned with the radial portion of said second light conductor for receiving the light guided through said second light conductor and directing the light passing therethrough into substantially parallel rays.

5. A combination of facsimile transmitter and receiver according to claim 4, wherein said radially outward end portions are arranged outwardly of said rotor peripheral surface and in close contact with each other, the radially outward end of said first light conductor extending more remotely from said predetermined axis than the radially outward end of said second light conductor and being bevelled to direct the light guided through said first light conductor towards said first predetermined point.

6. A combination of facsimile transmitter and receiver according to claim 4, wherein said light conductive device comprises a second lens positioned adjacent the outer end of said first light conductor for concentrating the light guided through said first light conductor to said first predetermined point, with said radially outward end portion of said second light conductor extending through the center of said radially outward end portion of said first light conductor and through the center of said second lens.

7. A combination of facsimile transmitter and receiver according to claim 4, said second light conductor further comprising a second portion extending along the axis of said rotor and having one end thereof adjacent said photoelectric device and being joined at its other end to said radially outward end portion thereof.

8. A combination of facsimile transmitter and receiver according to claim 7, wherein said light source and said photoelectric device are placed on the axially same side with respect to said radial portion.

9. A combination of facsimile transmitter and receiver according to claim 7, wherein said light source and said photoelectric device are placed on the axially opposite sides with respect to said radial portion.

10. A combination of facsimile transmitter and receiver according to claim 7, wherein said photoelectric device is placed axially remote from said radial portion and said light source is placed substantially on the radially inward extension of said radial portion.

* * * * *